United States Patent
Betley et al.

(10) Patent No.: US 11,255,441 B1
(45) Date of Patent: Feb. 22, 2022

(54) SECURING A SEAT IN A VALVE

(71) Applicant: Dresser, LLC, Houston, TX (US)

(72) Inventors: Justin Walker Betley, Raynham, MA (US); Peter David Gosselin, Weymouth, MA (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/000,420

(22) Filed: Aug. 24, 2020

(51) Int. Cl.
*F16K 1/42* (2006.01)

(52) U.S. Cl.
CPC .................................. *F16K 1/427* (2013.01)

(58) Field of Classification Search
CPC ...................................................... F16K 1/427
USPC ..................... 251/360; 285/317; 403/109.3
See application file for complete search history.

(56) References Cited

U.S. PATENT DOCUMENTS

| | | | | |
|---|---|---|---|---|
| 1,457,318 A | * | 6/1923 | Shevlin | F16K 1/427 251/360 |
| 1,770,112 A | * | 7/1930 | Smith | F16K 1/427 251/359 |
| 1,802,971 A | * | 4/1931 | Fischer | F16K 1/422 251/359 |
| 2,977,974 A | * | 4/1961 | Browne | F16K 1/465 137/243 |
| 4,043,687 A | * | 8/1977 | Van Dyke, Jr | F16B 7/10 403/109.3 |
| 4,397,331 A | * | 8/1983 | Medlar | F16K 47/02 137/375 |
| 5,005,605 A | | 4/1991 | Kueffer et al. | |
| 7,464,723 B2 | * | 12/2008 | Klein | F16K 17/06 137/524 |
| 9,010,371 B2 | * | 4/2015 | Folk | F16K 47/08 137/625.33 |

FOREIGN PATENT DOCUMENTS

| | | | | |
|---|---|---|---|---|
| GB | 295651 A | * | 8/1929 | F16K 1/427 |
| GB | 884227 A | * | 12/1961 | F16K 1/427 |

OTHER PUBLICATIONS

Baker Hughes, "Technical Specification for Masoneilan 84003 Series Steam Form Steam Conditioning Valves," Product Literature (May 2018).
BOMOAFA Valves, "Steam Conditioning Valves and Turbine Bypass Systems," Product Literature (2020).
CCI, IP/LP Turbine Bypass Valve for Intermediate Pressure and Low Pressure Bypass Applications, Product Literature (2002).
Cicor Energy, Aeroflow SCV | Steam Conditioning | Turbine Bypass Valve, Product Literature (2020).
Fisher Steam Conditioning Technologies, Product Literature (2014).

(Continued)

*Primary Examiner* — Kevin F Murphy
(74) *Attorney, Agent, or Firm* — Paul Frank + Collins P.C.

(57) ABSTRACT

A locking mechanism is configured to secure a seat on a valve. The configurations may include a pin with a tapered end. The pin extends into the valve body to engage with an engagement feature, like a slot, on the seat. The slot may reside on the downstream side of the seat. This location can provide ready access to the pin, for example, through various feature found on the valve body, such as a boss. For steam conditioning valves, the locking mechanism may prove useful because it allows the seat to easily remove from the valve body.

16 Claims, 6 Drawing Sheets

(56) References Cited

OTHER PUBLICATIONS

Hora Reglarmaturen, Steam Conditioning Valves Technical Bulletin, Product LIterature (2020).
IMI Critical Engineering, Valves and Solutions for Power Plants, Product LIterature (2020).
SPX, Product Bulletin "Direct Steam Conditioning Valve—Steam Atomising," Product Literature (2020).
Welland & Tuxhorn AG, Products and services Overview, Product Literature (2020).

* cited by examiner

SECURING A SEAT IN A VALVE

BACKGROUND

Flow controls play a large role in many industrial facilities. Power plants and industrial process facilities, for example, use different types of flow controls to manage flow of material, typically fluids, throughout vast networks of pipes, tanks, generators, and other equipment. Steam conditioning valves are useful to reduce pressure and temperature of steam. These valves require a particularly robust design to accommodate the extremely high temperatures (up to 650° C.) and pressures typical of many applications. This design includes certain components, like a valve body that houses a cage, a moveable plug (or closure member), and a stationary seat.

Various techniques are known to secure the stationary seat in the valve body. These techniques may use the cage to retain the seat in its position. However, this design often fails to account for thermal expansion (and contraction) of components. It also fails to accommodate "hung" cage applications. In other examples, fasteners may secure a retainer ring about the circumference of the seat. But screws in this design have been known to either come loose due to vibrations or, more likely, seize in the retainer over time. This latter problem can frustrate service and repair. A few other possible configurations use welds or complimentary threads on both the seat and the valve body to secure the seat in its position. However, like seized screws, both of these designs tend to conflagrate service and repair because they require complicated, labor-intensive machining and welding to occur in the field.

SUMMARY

The subject matter of this disclosure relates to techniques to secure the seat in the valve body. Of particular interest here are improvements that secure the seat at points "below" or downstream of a plug/seat interface, essentially where the moveable plug contacts the seat to prevent flow through the valve. These improvements may include a mechanism that is readily accessible from outside of the valve body. This mechanism is beneficial because it avoids hardware that can frustrate service and repair.

DRAWINGS

Reference is now made briefly to the accompanying drawings, in which.

Figure 1:
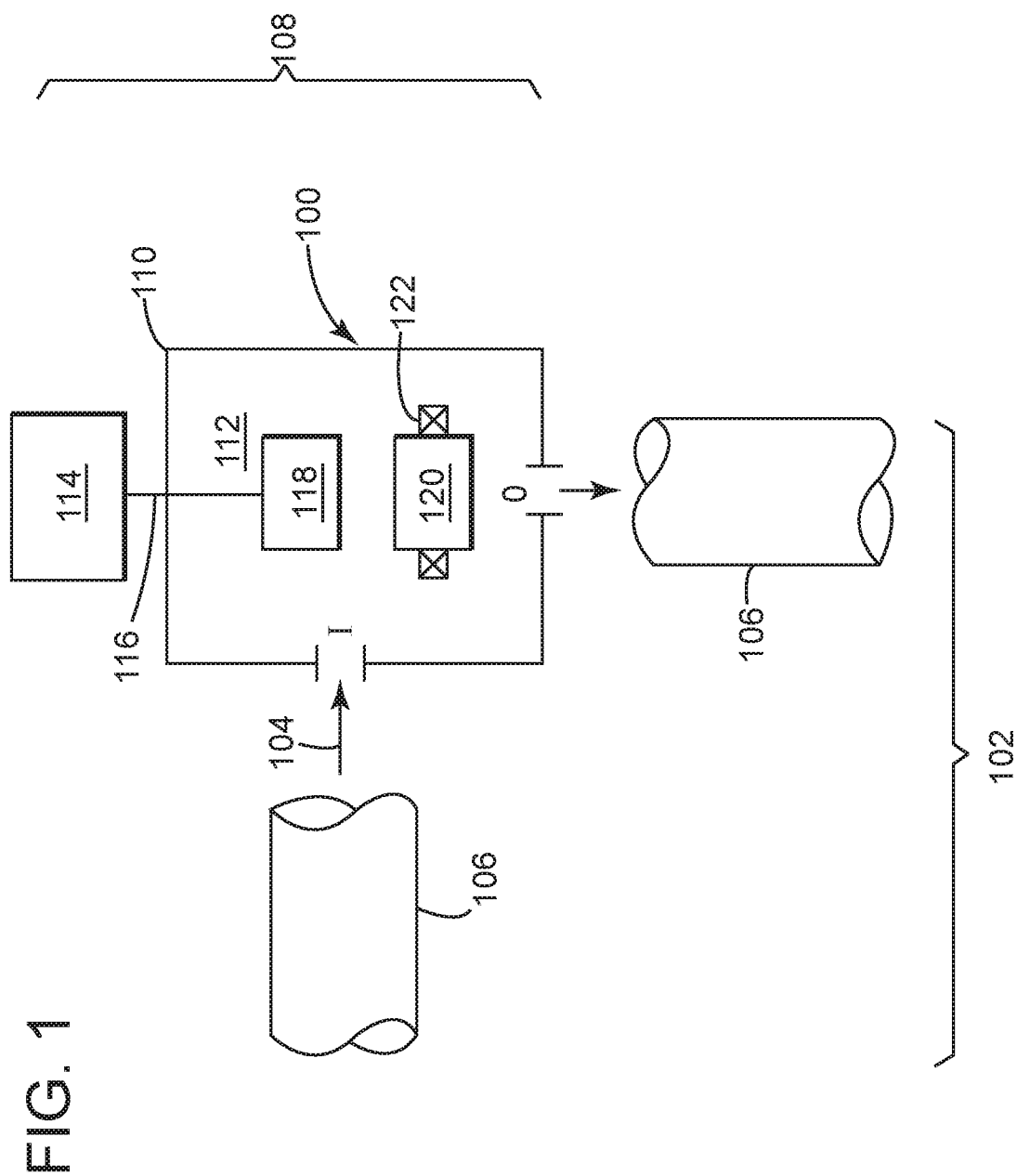
FIG. 1 depicts a schematic diagram of an exemplary embodiment of a retention mechanism.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DETAILED DESCRIPTION

The discussion now turns to describe features of the embodiments shown in drawings noted above. These features securely engage the seat in position on the valve. Other embodiments may be within the scope of this disclosure.

FIG. 1 depicts a schematic diagram of an example of a retention mechanism 100. This example is found in a distribution system 102, typically designed to carry material 104 throughout a network of conduit 106. The retention mechanism 100 may be part of a flow control 108, shown here with a valve body 110 that has an internal chamber 112 and openings (e.g., an inlet I and an outlet O). The flow control 108 may also include an actuator 114 with a stem 116 that couples with a closure member 118 inside of the valve body 110. The closure member 118 can move relative to a seat 120 to regulate flow of material 104. As also shown, the retention mechanism 100 may include a locking device 122 that engages with the seat 120.

Broadly, the retention mechanism 100 may be configured to facilitate manufacture and service of valves. These configurations may embody devices that allow technicians to have ready access to parts. This feature can facilitate repair because the technician need only remove certain pieces to gain access or, as noted below, release certain pieces to remove and replace them, as desired. As noted herein, these devices are much less likely to stick or seize over the operating life of the valve. For steam conditioning valves, these aspects can allow for rapid action on the valve in its installed location, thus reducing labor and, ultimately, costs to maintain expensive infrastructure common in power and resource industries.

The distribution system 102 may be configured to deliver or move resources. These configurations may embody vast infrastructure. For this example, material 104 is high pressure, high temperature steam; but material 104 could also comprise other gases, liquids, solids, or mixes, as well. The conduit 106 may include pipes or pipelines, often that connect to turbines, condensers, boilers, and the like. In other implementations, the pipes may form an intricate network that connects to tanks or reservoirs or even to residential homes or commercial properties.

The flow control 108 may be configured to regulate flow of steam through the conduit 106. These configurations may include steam conditioning valves and like devices. The valve body 110 in such devices is often made of cast or machined metals. Flanges are often formed at the openings I, O to connect to adjacent pipes 106. When in place, steam 104 may flow through the internal chamber 112, forming a flow path to an opening in the seat. Flow is typically in a direction from the "upstream" opening I to the "downstream" opening O. The actuator 114 may incorporate devices that use pneumatics or hydraulics. These devices are useful to regulate movement of the closure member 118, for example, a metal disc or metal "plug." The position of the plug 118 may correspond with at least a pair of operating states that manage flow of steam through the seat 120. A first or "open" state allows steam 104 to flow through the opening in the seat 120. A second or "closed" state that plug contacts the seat, where the formed "plug/seat interface" wholly prohibits flow of steam 104 through the opening in the seat 120. In one implementation, the device may react to a change in pressure to move between its operating states. This change may cause the device to actuate from is normally open state to its closed state to immediately shut off flow of the steam downstream of the valve body 110.

The locking device 122 may be configured to prevent movement of the seat 120. These configurations may include devices that can secure to the seat 120 on its downstream side D (FIG. 1). The downstream side may be consummate with locations on the seat 120 that correspond with flow of steam 104 after it enters the seat 120 and passes the plug/seat interface, for example, through the opening discussed above. These devices may also be accessible from points on the outside or periphery of the valve body 110. As noted herein, these concepts are meant to prevent seizing or sticking of components to avoid costly machining and welding at time of repair or maintenance on the valve 108.

Figure 2:
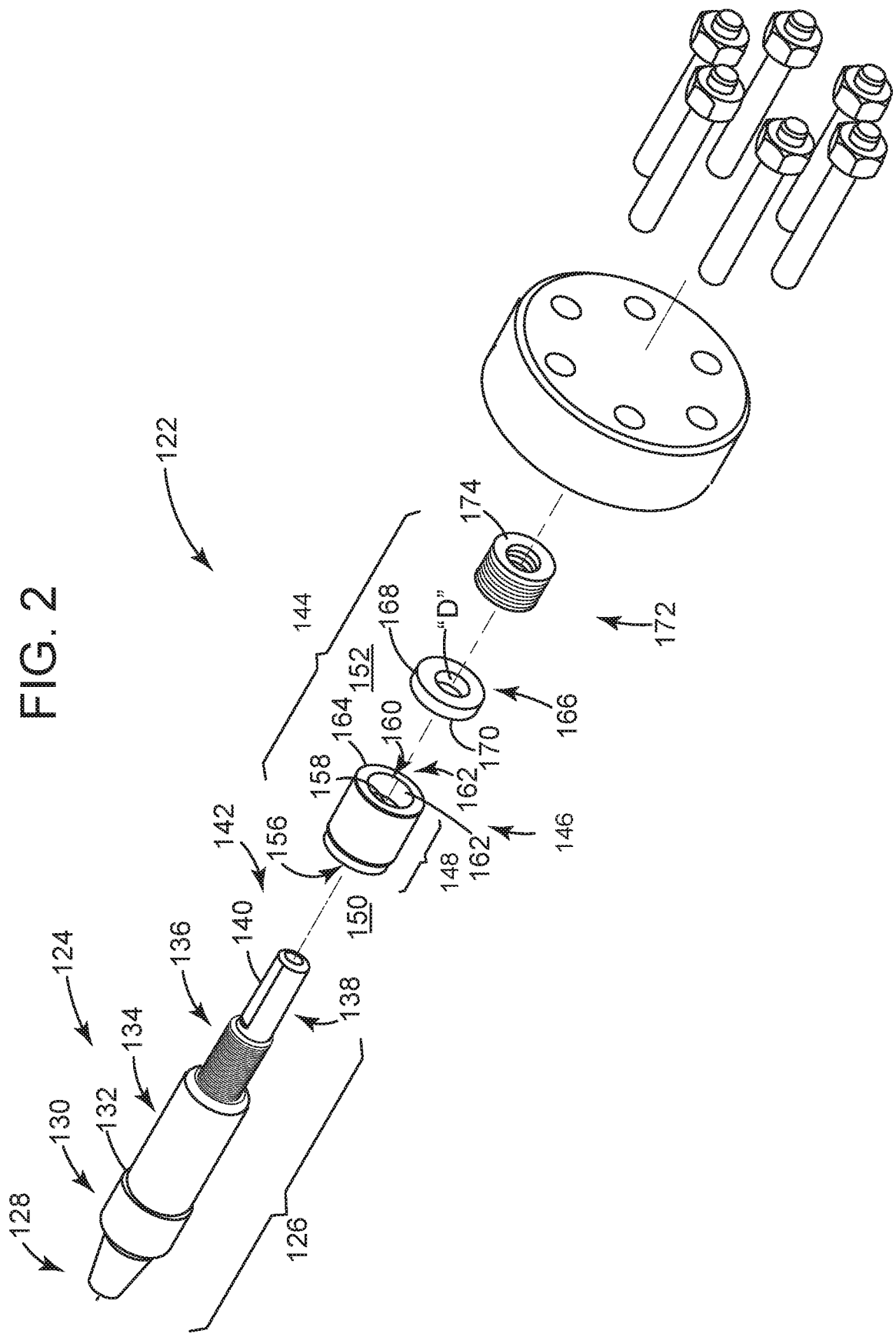
FIG. 2 depicts a perspective of exemplary structure for the retention mechanism of FIG. 1 in exploded form.

FIG. 2 depicts a perspective of exemplary structure for the retention mechanism 100 of FIG. 1 in exploded form. The locking device 122 may utilize an engagement pin 124 that can engage with the seat 120 (FIG. 1). The pin 124 can be configured to insert into the valve body 110 (FIG. 1) to prevent movement of the seat 120 (FIG. 1), while offering better opportunity for technicians to more easily repair or service the seat 120 (FIG. 1) (often with the flow control 108 (FIG. 1) in its installed position). These configurations may include an elongate, cylindrical pin 126, preferably made of metal(s) like hardened steel. The pin 126 may have a proximal end 128 with at least one tapered surface. Techniques to form the end 128 may result in a cone or conical shape that is useful for this purpose. Continuing from the tapered end 128, the pin 126 may have a diameter that increases to form a bore portion 130 that terminates at a shoulder 132. The diameter decreases at the shoulder 132 to form a middle portion 134. A threaded portion 136 may abut the middle portion 134. The diameter of the pin 126 then reduces after the threaded portion 136 to form a flatted portion 138 with a flat 140 that terminates at a distal end 142.

A pin retention assembly 144 may be configured to retain the pin 126 in the valve body 110 (FIG. 1) and provide the technician access the pin 126 from outside of the valve body 110 (FIG. 1). These configurations may include a pin clamp 146 that can insert onto the distal end 142 of the pin 126. The pin clamp 146 may have a cylindrical body 148 with ends 150, 152. A through-bore 154 may extend through the body 148. The through-bore 154 may have a first counter-bore 156 at the first end 150 that terminates at threads 158. A second counter-bore 160 may penetrate the body 148 from the second end 152 and terminate at the threads 158. The second end 152 may have an exposed face 162 with openings 164 disposed circumferentially around the second counter-bore 160. In one implementation, the assembly 144 may also include a pin locker 166, shown here as a disc 168 with "D"-shaped opening and pins 170 that extend towards the pin clamp 146 disposed thereon. The pins 170 may reside diametrically opposite of one another; but other orientations of the pins 170 may prevail as well. In one implementation, the pins 170 may insert into openings 164 on the exposed face 162 of the pin clamp 146. The assembly 144 may also utilize a load 172 to apply a retaining force on the pin 126 that retains it in engagement with the seat 120 (FIG. 1). The load 172 may comprise one or more springs 174 forming a spring assembly. The springs 174 may embody Bellville washers or like constant force devices. However, alternatives like compression springs may find use here as well.

Figure 3:
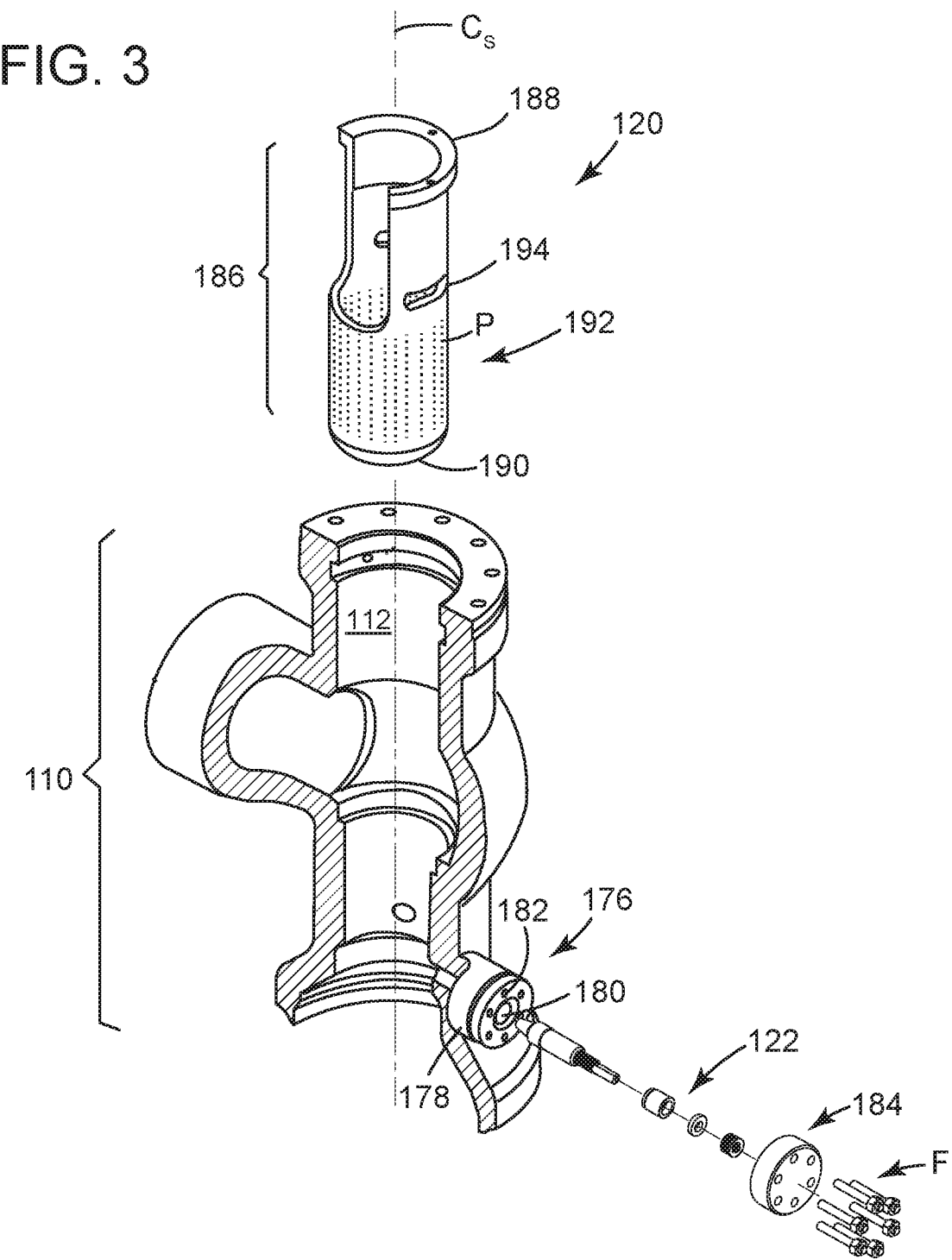
FIG. 3 depicts a perspective view of a locking device or use in the retention mechanism of FIG. 2.

FIG. 3 depicts a perspective view of the locking device 122 of FIG. 2 along with exemplary structure for the flow control 108. In this example, the valve body 110 may have one or more locking locations 176, each with a boss 178 that has a centrally-located bore 180 that extends to the internal chamber 112. The centrally-located bore 180 may have a diameter to receive the pin 126 and parts of the pin retention assembly 144. The boss 178 may also have apertures 182 that circumscribe the bore 180. The apertures 182 may have threads complimentary to fasteners F that secure an end cap 184 to the boss 178. In one implementation, the seat 120 may have a cylindrical body 186 with a flanged end 188 and a closed bottom end 190. A perforated section 192 with openings P may populate space between the ends 188, 190. The body 186 may also include apertures 194, shown here as elongate slots that reside between the flanged end 188 and the perforated section 192. The elongate slots 194 may be spaced radially apart from each other about a center axis Cs of the cylindrical body 186.

Figure 4:
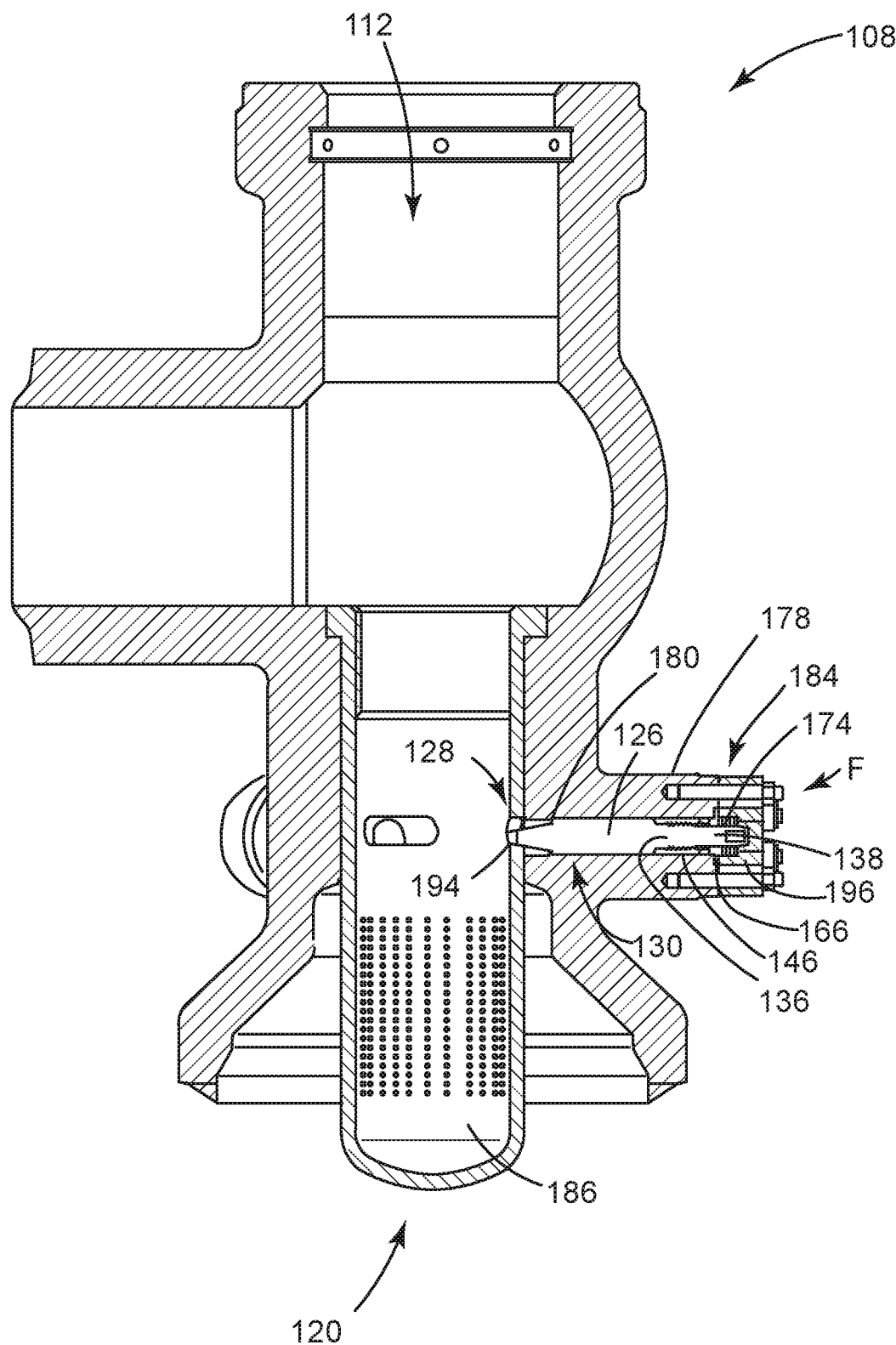
FIG. 4 depicts an elevation view of the cross-section of an example of a flow control.

FIG. 4 shows an elevation view of the cross-section of the flow control 108 of FIG. 3 in assembled form. In one implementation, the pin 126 extends through the bore 180 to locate the tapered end 128 inside one of the slots 194. The bore portion 130 of the pin 126 may contact the surface of the bore 180, for example, with a slip fit or slight interference fit. This feature maintains axial position of the pin 126 in the bore 180. Next, the pin clamp 146 may thread onto the threaded portion 136 of the pin 126. The pin locker 166 may then slide onto the flatted portion 138 of the pin 126, preferably with the "flat" part of the "d"-shaped opening aligned with the flat 140. The pins 170 on the pin locker 166 can engage with openings 164 on the exposed face 162 of the pin clamp 146. Springs 174 may slide over the flatted portion 138 and into contact the pin locker 166. It may benefit the design for the end cap 184 to have a recess 196 that can receive the distal end 142 of the pin 126 and the springs 174. Fasteners F secure the end cap 184 on boss 178. Preferably, the recess 196 has a depth that compresses the springs 174 with the end cap 184 in position. This feature creates a load on the pin locker 164 to maintain the pin 126 in its engaged position with the seat 120.

Figure 5:
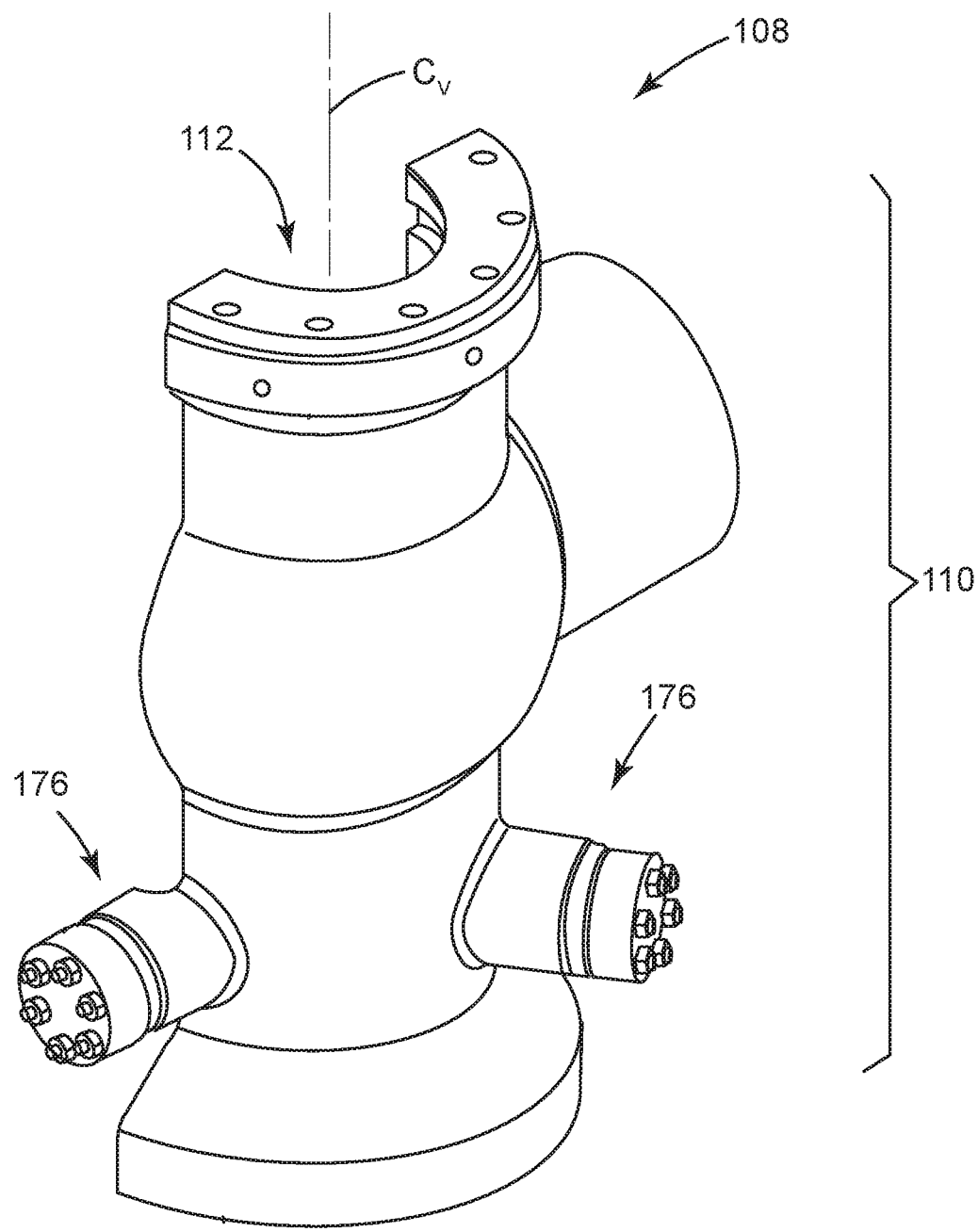
FIG. 5 depicts a perspective view from the back of the flow control of FIG. 4.

FIG. 5 depicts a perspective view from the back of the flow control 108 of FIG. 4. The valve body 110 may accommodate extreme pressures and temperatures that might prevail, for example, in steam conditioning applications. In one implementation, the locking locations 176 are spaced radially apart from one another about center axis Cv. As noted above, the locking locations 176 may align with the slots 194 (FIG. 4) on the seat 120 (FIG. 4). This feature permits use of several, separate pins 126 (FIG. 4) to securely maintain the seat 120 (FIG. 4) in position in the internal chamber 112. In one example, the device may have three locking locations 176 to provide three locations of engagement to secure the seat in the valve body 110. These locations 176 may be spaced apart from another one another by 120° as measured relative to the center axis Cv.

Figure 6:
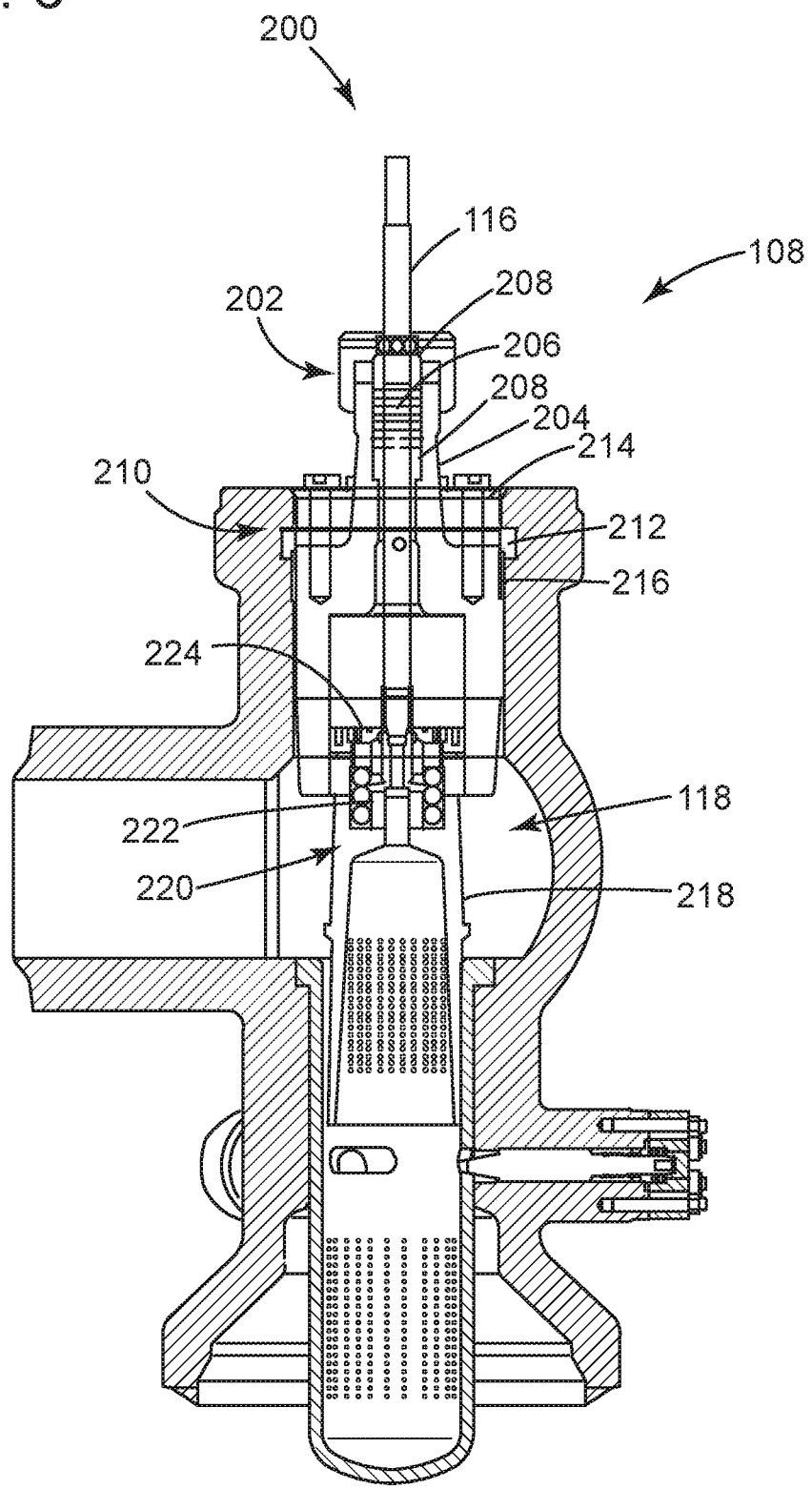
FIG. 6 depicts the cross-section of the flow control of FIG. 4.

FIG. 6 depicts an elevation view of the cross-section of the flow control 108 of FIG. 5 with additional components 200 of the flow control 108 shown for clarity. The stem 116 extends through packing assembly 202 found on top of bonnet 204. The packing assembly 202 may include packing material 206 disposed between bushings 208. A retainer assembly 210 secures the bonnet 204 in position in the valve body 110. The retainer assembly 210 may include a retainer 212 and a back-up ring 214. A pressure seal 216 may be included as well. The closure member 118 may include a plug 218 with a pilot 220 disposed therein. A pilot spring 222 inserts into the plug 218 on one side of the pilot 220. On the other, a retainer 224 is used to keep the pilot 220 in position in the plug 218.

In view of the foregoing, the improvements herein make a seat in a valve, like a steam condition valve, easy to remove and service. The embodiments may utilize a releasable pin that engages with complimentary features on the seat. The components may be on the downstream side of the seat opening (or the "plug/seat interface" noted above). This concept avoids screws (and other fasteners) or welds as the primary method to secure the seat in its position in the valve. A technical effect is to avoid seizing, which often prevails with other fastening techniques and can frustrate repair and maintenance on the valve.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control, comprising:
    a valve body with an internal chamber, an inlet to the internal chamber, and an outlet to the internal chamber that is perpendicular to the inlet;
    a valve seat disposed in the internal chamber;
    a pin with a first end that inserts through the valve body into the valve seat; and
    a retention assembly for retaining the pin in the valve seat, the retention assembly comprising a pin clamp, a disc, and a spring assembly, all being resident on the pin and in order from the first end to a second end of the pin.

2. The flow control of claim 1, wherein the first end of the pin is tapered.

3. The flow control of claim 1, wherein the second end is accessible from outside of the valve body.

4. The flow control of claim 1, further comprising:
    a cover attached to the valve body to prevent the pin from backing out of the valve body.

5. The flow control of claim 1, wherein the pin extends perpendicular to a flow axis of the seat.

6. The flow control of claim 1, wherein the valve body includes a boss member with a bore extending through to the internal chamber to receive the pin.

7. The flow control of claim 1, wherein the valve seat comprises a slot to receive the first end of the pin.

8. The flow control of claim 1, wherein the valve seat comprises a plurality of slots circumferentially spaced apart from one another about a center axis of the valve seat.

9. The flow control of claim 1, wherein, when the valve body is connected to an adjacent conduit to receive flow, the pin resides on a downstream side of the seat.

10. A flow control, comprising:
    a valve body with an internal flow path having an inlet and an outlet perpendicular to the inlet;
    a seat disposed in the flow path, the seat having a cylindrical body with a central axis and a flanged end forming an opening, the seat secured in the valve body at engagement points in the form of an elongate slot that penetrates through seat and are found on a first side of the flanged end, the elongate slot having a length perpendicular to the center axis that is longer than its height parallel to the center axis; and
    a closure member disposed on a second side of the flanged end of the seat, the closure member being movable to restrict flow through the opening,
    wherein the valve body comprises boss members extending outwardly, the boss members having an aperture to receive pins that extend into the seat.

11. The flow control of claim 10, wherein the engagement points are spaced circumferentially apart from one another about a centerline of the valve body so as to circumscribe the opening.

12. The flow control of claim 10, wherein the seat comprises a perforated area on the first side of the flanged end.

13. The flow control of claim 10, wherein the valve body has locking locations spaced circumferentially apart from one another about a centerline of the valve body to receive pins that extend into the seat.

14. The flow control of claim 10, further comprising pins that extend into the seat, wherein the pins are spaced circumferentially apart from one another about a centerline of the valve body.

15. The flow control of claim 10, wherein, when the valve body is connected to an adjacent conduit to receive flow, the engagement points reside on a downstream side of the flanged end.

16. A system for securing a seat on a steam conditioning valve, the system comprising:
    a seat having a cylindrical body with a center axis and elongate slots disposed about the center axis; and
    a locking mechanism to engage the elongate slots on the seat, the locking mechanism having pins with a tapered end that fits inside of the elongated slots; and
    a pin retention assembly having a pin clamp, a disc, a spring assembly, and a cover,
    wherein the pin clamp threads onto a threaded section of the pin, the disc inserts onto the pin and contacts the pin clamp, the spring assembly contacts the pin clamp and the cover, and the cover attaches to part of a steam conditioning valve to prevent translation of the pin.

\* \* \* \* \*